(12) United States Patent
Abarca et al.

(10) Patent No.: US 8,034,867 B2
(45) Date of Patent: Oct. 11, 2011

(54) HYBRID CLAYS FOR OBTAINING NANOCOMPOSITES AND A PREPARATION PROCESS THEREFORE

(75) Inventors: Raùl Quijada Abarca, Santiago (CL); Patricio Toro Estay, Santiago (CL); Mehrdad Yazdani-Pedram, Santiago (CL)

(73) Assignee: Universidad de Chile, Santiago (CL)

( * ) Notice: Subject to any disclaimer, the term of this patent is extended or adjusted under 35 U.S.C. 154(b) by 0 days.

(21) Appl. No.: 12/422,655

(22) Filed: Apr. 13, 2009

(65) Prior Publication Data

US 2009/0209687 A1 Aug. 20, 2009

(30) Foreign Application Priority Data

Oct. 11, 2006 (CL) .................................. 2730/2006
Oct. 9, 2007 (EP) ........................ PCT/EP07/60694

(51) Int. Cl.
*C08K 3/34* (2006.01)
*C08K 5/24* (2006.01)
(52) U.S. Cl. ....................... 524/445; 524/262
(58) Field of Classification Search ................... 524/445
See application file for complete search history.

(56) References Cited

U.S. PATENT DOCUMENTS

| | | | |
|---|---|---|---|
| 2,531,396 A | 11/1950 | Carter et al. | |
| 3,849,516 A | 11/1974 | Plank | |
| 4,412,018 A | 10/1983 | Finlayson et al. | |
| 4,472,538 A | 9/1984 | Kamigaito et al. | |
| 4,690,868 A | 9/1987 | Rice | |
| 4,739,007 A | 4/1988 | Okada et al. | |
| 4,798,766 A | 1/1989 | Rice | |
| 4,810,734 A | 3/1989 | Kawasumi et al. | |
| 4,889,885 A | 12/1989 | Usuki et al. | |
| 5,091,462 A | 2/1992 | Fukui et al. | |
| 5,137,975 A | 8/1992 | Kelusky | |
| 5,164,440 A * | 11/1992 | Deguchi et al. | 524/444 |
| 5,451,639 A | 9/1995 | Marczinke et al. | |
| 5,476,905 A | 12/1995 | Schwager et al. | |
| 5,552,469 A | 9/1996 | Beall et al. | |
| 5,866,645 A | 2/1999 | Pinnavaia et al. | |
| 5,993,769 A | 11/1999 | Pinnavaia et al. | |
| 6,261,640 B1 | 7/2001 | Pinnavaia et al. | |
| 6,380,295 B1 | 4/2002 | Ross et al. | |
| 6,399,191 B1 | 6/2002 | Wong | |
| 6,521,690 B1 | 2/2003 | Ross et al. | |
| 6,583,209 B2 | 6/2003 | Mehta et al. | |
| 6,794,437 B2 | 9/2004 | Ross et al. | |
| 2002/0055581 A1 | 5/2002 | Lorah et al. | |
| 2003/0092816 A1 | 5/2003 | Mehta et al. | |
| 2004/0071422 A1 * | 4/2004 | Aylward et al. | 385/124 |
| 2004/0087700 A1 | 5/2004 | Ross et al. | |
| 2004/0097630 A1 * | 5/2004 | Whitman et al. | 524/445 |
| 2006/0199890 A1 | 9/2006 | Fasulo et al. | |
| 2008/0076832 A1 | 3/2008 | Winters et al. | |
| 2010/0160509 A1 | 6/2010 | Yazdani-Pedram | |

FOREIGN PATENT DOCUMENTS

| | | |
|---|---|---|
| DE | 4022570 | 1/1992 |
| DE | 4308588 | 9/1994 |
| DE | 4308590 | 9/1994 |
| EP | 0370735 | 5/1990 |
| EP | 0370736 | 5/1990 |
| EP | 0952187 | 10/1999 |
| EP | 1055706 | 11/2000 |
| JP | 01238577 A * | 9/1989 |
| WO | WO 00/44825 A1 | 8/2000 |
| WO | WO 01/66268 A1 | 9/2001 |
| WO | WO 03/022917 A1 | 3/2003 |
| WO | WO 2006/058846 A1 | 6/2006 |
| WO | WO 2008/044121 A1 | 4/2008 |

OTHER PUBLICATIONS

Abstract of JP01238577, Sep. 1989.*
Moncada et al., Use of PP Grafted with Itaconic Acid as a New Compatibilizer for PP/Clay Nanocomosites, Macromolecular Chemistry and Physics, published online Jul. 31, 2006 and Aug. 2, 2006, vol. 207, Issue 15, pp. 1376-1386 (cover & 11 pages).
Pesetskii et al. "Free Radical Grafting of Itaconic Acid and Glycidyl Methacrylate onto PP Initiated by Organic Peroxides." *Journal of Applied Polymer Science*. vol. 86. 2002. pp. 64-72.

* cited by examiner

*Primary Examiner* — Ling Choi
*Assistant Examiner* — Hui Chin
(74) *Attorney, Agent, or Firm* — Hasse & Nesbitt LLC; Daniel F. Nesbitt

(57) ABSTRACT

Hybrid clays for obtaining nanocomposites useful in the automotive, aviation, construction and packaging industry, among others. The hybrid clay comprises clays intercalated with the itaconic acid (ITA) monomer or its derivative monooctadecyl itaconate (MODIT), and a process for the preparation of these hybrid clays and the process to obtain polyolefin/clay nanocomposites.

14 Claims, 1 Drawing Sheet

HYBRID CLAYS FOR OBTAINING NANOCOMPOSITES AND A PREPARATION PROCESS THEREFORE

Figure 1:
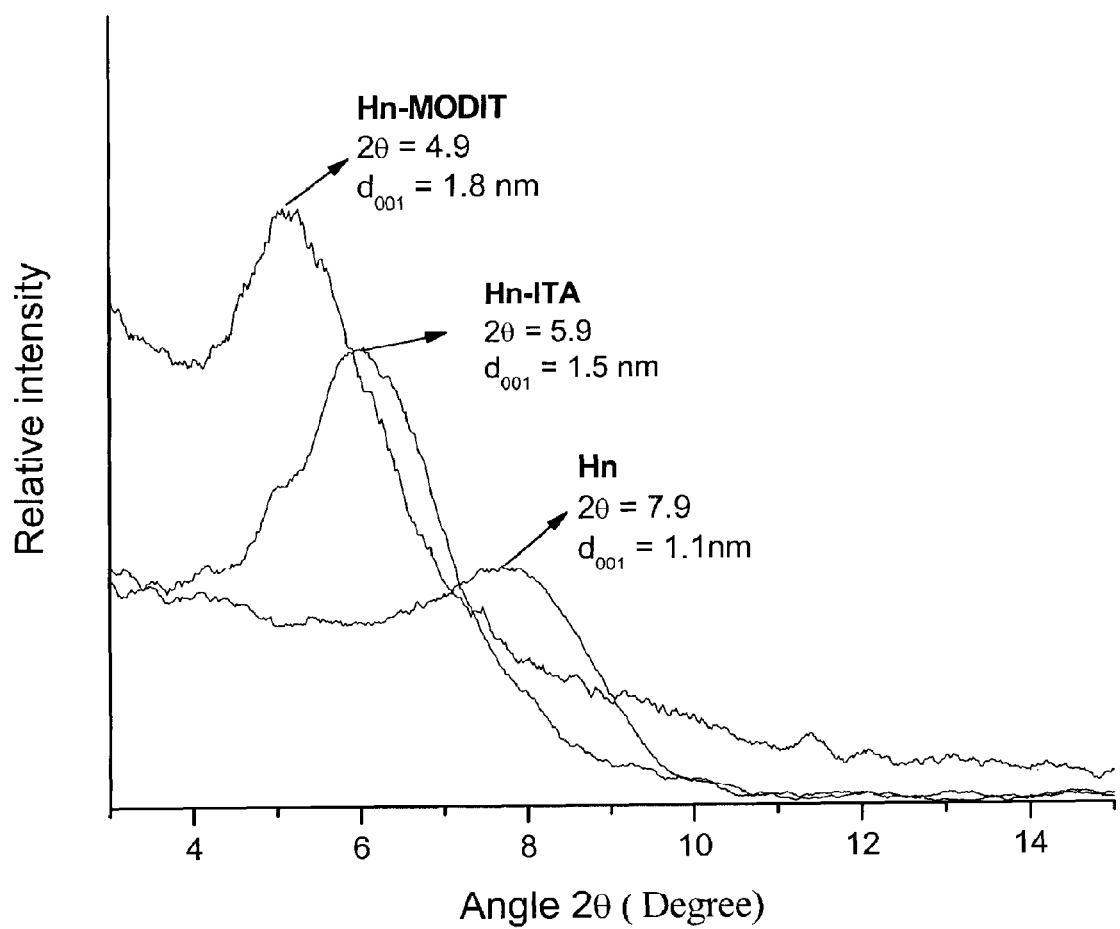

This application claims priority of International Patent Application PCT/EP07/060694, filed Oct. 9, 2007, which claims priority to Chilean Patent Application 2730/2006, filed Oct. 11, 2006.

FIELD OF THE INVENTION

The clays used such as montmorillonite and hectorite are clays of the laminar phyllosilicate type and they have some structural characteristics similar to those of minerals like talc and mica. The phyllosilicates have a structure based on the stacking of planes of oxygen and hydroxyl ions. The tetrahedral $(SiO)_4^{4-}$ groups are joined, sharing three of their four oxygens with other neighbors forming layers of infinite extension and formula $(Si_2O_5)^{2-}$, which constitute the basic unit of the phyllosilicates. In these clays, the tetrahedra are distributed forming hexagons. The tetrahedral silicon may be partially replaced by $Al^{3+}$ or $Fe^{3+}$.

These tetrahedral layers are attached to other octahedral ones of the gibbsite or brucite type in which some $Al^{3+}$ or $Mg^{2+}$ may be replaced by $Fe^{2+}$ or $Fe^{3+}$, and more rarely by Li, Cr, Mn, Ni, Cu or Zn. The bonding plane between the two layers is formed by the oxygens of the tetrahedra that were not being shared with other tetrahedra (apical oxygens) and by $(OH)^-$ groups from the brucitic or gibbsitic layer, so that in that plane there is an $(OH)^-$ left in the center of each hexagon formed by six apical oxygens. The remaining $(OH)^-$ are replaced by the oxygens of the tetrahedra.

In some phyllosilicates (smectites, vermiculites and micas, among others) the sheets are not electrically neutral due to the replacement of some cations by others having different charge. The charge balance is maintained by the presence in the interlaminar space, or the space existing between two consecutive sheets, of cations (as in the mica group, for example), hydrated cations (as in the vermiculites and smectites), or hydroxyl groups coordinated octahedrally, similar to the octahedral layers, as in the chlorites. The unit formed by a sheet plus the interlaminar layer is the structural unit. The most frequent interlaminar cations belong to the alkali (Na and K) or alkaline earth (Mg and Ca) groups.

Clay-containing polymers are widely used as alternatives or replacement materials for steel or other metal products, especially in the aerospace and automotive industries. These materials find uses in an increasing number of other fields that include bridge components as well as replacements for heavier steel pieces as in ship construction. By extrusion and injection molding, a nylon matrix, for example, has been reinforced successfully with hybrid clays such as montmorillonite, bentonite or hectorite. The dispersion of these hybrid clays in a polymer matrix allows polymer/clay nanocomposites to be obtained whose mechanical, thermal, dimensional stability, barrier, and other properties depend directly on the degree of clay dispersion in the polymer matrix. This is attributed to the confinement of the polymeric matrix chains between the countless clay sheets. Montmorillonite, bentonite and hectorite are also clays that are made of flat silicate sheets whose thickness is of the order of one nanometer. These polymer/clay nanocomposites have important commercial applications not only in the synthesis and properties of the organic/inorganic nanostructures, as mentioned before, but also in diverse areas such as ultrathin polymer films.

Organically modified silicates or hybrid clays produced by a cation exchange reaction between the clay and a quaternary ammonium or alkylammonium salt are used for the preparation of nanocomposites. The cations of the alkyl group are intercalated between the natural clay layers, giving rise to organophilic or hybrid clay. This transformation makes the clay more hydrophobic and more easily dispersible in non-polar polymers such as polyolefins.

BACKGROUND OF THE INVENTION

The first scientific report of the use of hybrid clays in the preparation of nanocomposites appeared in the U.S. Pat. No. 2,531,396, the disclosure of which is incorporated herein by reference. This patent, filed in 1947, describes the use of organically modified bentonites to provide structural reinforcement to elastomers such as rubber, polychloroprene and polyvinyl compounds. Several patents granted in 1984, for example U.S. Pat. Nos. 4,472,538; 4,739,007; 4,810,734; 4,889,885; and 5,091,462, the disclosures of which are incorporated herein by reference, use hybrid clays for plastics and describe the use of structural commercial plastics, for example, to replace steel components in automobiles.

Patents not related to nanocomposites have also been published describing hybrid clay compositions as technological additives that include the product of the reaction of clay, the cuaternary ammonium compound and the organic anions that are inserted in the clay, for example, U.S. Pat. No. 4,412,018, the disclosure of which is incorporated herein by reference, which uses a large variety of organic compounds, including carboxylic acids, that are capable of reacting with the quaternary ammonium.

The manufacture of nanocomposites also includes the mixture of hybrid clay with a powdered polymer, which is compressed to obtain a pellet while is heated at an appropriate temperature. For example polyestyrene has been intercalated by mixing polystyrene with montmorillonite modified with alkylammonium and heated in vacuum. The temperature is chosen in such a way that it is higher than the glass transition temperature of polystyrene in order to ensure the melting of the polymer.

U.S. Pat. No. 4,810,734, the disclosure of which is incorporated herein by reference, describes a different process for producing a nanocomposite that involves a contact step between a clay with a cation exchange capacity of 200 milliequivalents per 100 g with a swelling agent in a dispersing medium, forming a complex that has the property of swelling with the monomer (for example, an amino acid for a polyamide, vinyl chloride for vinyl polymers, among others) and then the monomer in the mixture is polymerized. The "swelling agent" used has an onium ion (for example, the ammonium, triethylammonium, trimethylphosphonium or dimethylsulfonium ions, among others) and a functional group (for example, a vinyl, carboxyl, hydroxyl, epoxy or amino group, among others) capable of reacting with the polymer. U.S. Pat. No. 4,889,885, the disclosure of which is incorporated herein by reference, describes a nanocomposite that comprises at least one resin chosen from the vinyl base polymer group, a thermostable resin and a rubber, and laminar bentonite uniformly dispersed in the resin. The laminar silicate has a layer thickness of approximately 7 to 12 nm, and an interlaminar distance of at least 30 nm, where the resin is connected with a silicate sheet by means of an intermediary.

There have also been several U.S. patent applications, among them U.S. Pat. Nos. 4,690,868 and 4,798,766, the disclosures of which are incorporated herein by reference, in which ammonium gas is used to modify smectic clays prior to preparing the nanocomposite.

Many of the products described in the aforementioned references cite that the products are easy to process and isolate, but are difficult to disperse in a polymer matrix.

Hybrid clays manufactured by intercalation of the quaternary ammonium salts are easy to isolate by filtering and washing because the clay acquires a more hydrophobic character. These materials, however, do not have good compatibility with certain plastic materials.

U.S. Pat. No. 5,552,469, the disclosure of which is incorporated herein by reference, describes the use of hybrid clay by intercalation in a water-soluble polymer, but there are problems in separating the modified clay from the aqueous phase. Isolation of the clay was possible from the aqueous solution at 100° C. This process leaves unintercalated polymer together with the intercalated clay, and therefore its isolation is not possible. A mixture of clay and monomer was subjected to polymerization forming a nanocomposite in situ in which the clay is well dispersed in the polymer. Unfortunately, this technique is a polymerization process of very high cost and it also produces contamination of the plant with clay.

Recent patents of invention since 1999, including U.S. Pat. No. 5,993,769; EP0952187; WO0044825; EP1055706; WO0166268; US2004087700; WO2006058846, the disclosures of which are incorporated herein by reference, have shown the interest in the development of nanocomposites using hybrid clays or clays intercalated with various synthetic and commercial organic compounds, and even some of natural origin, with the purpose of trying to optimize the compatibilization with polymer matrices in order to obtain nanocomposites.

SUMMARY OF THE INVENTION

The present invention relates to an organic intercalation compound, and its use for obtaining hybrid clays to be used in the preparation of nanocomposites, and by use of organic compounds, also called compatibilizers, which are organic compounds that facilitate the dispersion of hybrid clays in polymers. The present invention also relates to melt processes that are simple and reproducible and lead to nanocomposites with improved mechanical and thermal properties.

The present invention relates to the preparation of hybrid or modified clays by using alternative organic compounds or clay modifiers that allow an effective increase of their interlayer spacing. The organic compounds used as clay modifiers are monomers of itaconic acid (ITA) or its derivative, monooctadecyl itaconate (MODIT). The hybrid clays are obtained by intercalation with these monomers, which are characterized by having functional groups with a hydrophobic character, and thereby compatible with organic compounds such as polyolefins. The hybrid clays obtained in this invention can be isolated easily from their aqueous suspensions with a controlled degree of purity, and also their dispersion in polyolefins is facilitated to form nanocomposites. This invention further refers to the processes that make use of alternative raw materials to obtain the hybrid clays or modified clays and to the processes for obtaining polyolefin nanocomposites from these hybrid clays.

The organic compounds or monomers used in this invention make it possible to modify the clays, that is to obtain hybrid clays by intercalation of these monomers followed by the dispersion of the hybrid clays in polyolefin matrices by using a compatibilizer (understanding by compatibilizer is meant an organic compound that promotes the joining of, for example, hybrid clays and polyolefin matrices) to facilitate the formation of nanocomposites. The compatibilizer used in this invention comprises a polyolefin grafted with the itaconic acid monomer or its derivative, monooctadecyl itaconate, with a controlled degree of grafting. A compatibilizer with a certain degree of grafting between 0.4-1.8% by weight that has been described by the applicants in W02008/044121, published Apr. 17, 2008, entitled "Compatibilizers for producing nanocomposites, microcomposites and polymer blends, and the processes for obtaining them", the disclosure of which is incorporated herein by reference. The present invention allows polyolefin nanocomposites to be obtained characterized by an improved mechanical and thermal performance properties with respect to that of polyolefin nanocomposites that use clays modified with amines and compatibilizers other than those used in this invention, such as the hybrid clays obtained by intercalation of amines, for example, octadecylamine and polyolefins grafted with maleic anhydride (MAA) as compatibilizers. The nanocomposites of this invention may be used in all fields and in applications that require these kinds of materials, such as the automotive, electronics, packaging, textile and construction, among others.

The hybrid clays are used for the preparation of nanocomposites based on polyolefins. It also relates to the processes for obtaining these hybrid clays and processes for preparing nanocomposites of polyolefins containing these hybrid clays. The nanocomposites of this invention can be used in the automotive, electronics, packaging, textiles and construction, among others.

DETAILED DESCRIPTION OF THE INVENTION

For a better understanding of the invention, the following terms have the meanings shown below:

As used herein, the terminology "hybrid clay" means a clayu that is modified or intercalated with organic compounds such as itaconic acid or a derivative thereof, including monooctadecyl itaconate.

As used herein, the terminology "compatibilizer" means an organic compound that allows two or more chemicals to be mixed without separation into discrete phases, such as a non-polar polymer and polar micro- or nano-particles.

As used herein, the terminology "polymeric nanocomposite" means a material formed by dispersion of nanometer-size particles in a macroscopic component like a polymer matrix.

As used herein, the terminology "monomer" means an organic compound or basic molecular unit that can be repeated to form a molecular structure that contains that unit a finite number of times.

As used herein, the terminology "polymer" means an organic compound that consists of structural units that are repeated a defined times and whose connection is through covalent chemical bonds.

As used herein, the terminology "polydispersity" means an indication of the degree of variation or amplitude of a Gaussian curve that represents the average molecular weights of a polymer.

As used herein, the terminology "polyolefin" means a material obtained by polymerization of monomers such as ethylene, propylene homopolymers as well as copolymerization of these monomers with alpha olefins.

As used herein, the terminology "masterbatch" means a material formed by mixing a polymer with high amount of an additive in particle form. Thus, this material is can be used to prepare other materials that contain lower concentration of the same additive. That is, for example, a masterbatch of polymer and clay particles for obtaining a polymer/clay nanocomposite.

An aspect of the invention includes hybrid clays and the process for obtaining them, such as, for example, clays of the smectic type intercalated with itaconic acid (ITA) or its derivative, monooctadecyl itaconate (MODIT). These hybrid clays are characterized by having interlaminar spacings of 1.9 nanometers for the intercalated clays compared to 1.1 nanometer for the nonintercalated clays. Moreover, these hybrid clays have a hydrophobic character are less hydrophylic due to the contribution of the nonpolar groups of the ITA and/or MODIT intercalated in the clay. Therefore, these hybrid clays have greater interlaminar spacing and hydrophobic character than the hybrid clays intercalated with an aliphatic amine such as octadecylamine (ODA). The present invention also relates to the use of these hybrid clays for making nanocomposites of polyolefins, and it also describes the procedure process for obtaining them.

The hybrid clays are produced by intercalation of the monomers of this invention in smectic clays, including montmorillonite (Mo), hectorite (Hn), by mixing in solution at room temperature, and the procedure for obtaining them is described.

Furthermore, another aspect of the invention includes a process or procedure for obtaining nanocomposites based on polyolefins and hybrid clays through the use of alternative raw materials for their preparation, that is, both the raw materials for obtaining hybrid clays as well as the compatibilizer(s) used for preparing the polyolefin-based nanocomposites. Specifically, an aspect of the invention includes the replacement of clay modified with an aliphatic amine such as octadecylamine by a clay modified with the monomers of ITA or a derivative thereof, including MODIT. In the case of the compatibilizers the invention relates to the use of organic compounds that comprise a polyolefin grafted with ITA or its derivative MODIT with different degrees of grafting instead of a compatibilizer or organic compound like such as a polyolefin, for example polypropylene (PP) grafted with maleic anhydride (PP-g-MAA). The nanocomposites thus prepared are characterized by having improved mechanical and thermal properties with respect to the nanocomposites prepared by using clays modified with different amines in addition to commercial compatibilizers such as a polyolefin grafted with maleic anhydride (MAA).

The description of this invention considers:

1. Employing hybrid clays that comprises the use of alternative organic compounds (i) and compatibilizers (ii) to be applied to obtain in the preparation of polymeric polyolefin/clay nanocomposites.

The organic compounds and compatibilizers considered in this invention include:

i) itaconic acid monomer (ITA) or its derivative, monooctadecyl itaconate (MODIT) to obtain modified or hybrid clays characterized by having hydrophobic character and increased interlaminar spacing.

The modified clays of the smectic type or the hybrid clays intercalated with the ITA or MODIT monomers that are developed in this invention correspond to hybrid clays that are easy to isolate with a controlled degree of purity and high compatibility to achieve a good dispersion in polyolefins. Furthermore, the hybrid clays of this invention have not been described either in the scientific literature or in patents of invention. The hybrid clays described in the scientific literature and patents of invention are those that have been modified mainly by the use of different type of aliphatic or aromatic amines.

ii) Compatibilizers based on polyolefins having a polar character as a result of the incorporation (grafting) of polar compounds such as ITA or MODIT.

The compatibilizer is an organic compound based on a polyolefin that contains polar carboxyl groups coming from ITA or MODIT. Their production has been described by the applicants in WO2008/044121, published Apr. 17, 2008, entitled "Compatibilizers for producing nanocomposites, microcomposites and polymer blends, and the processes for obtaining them", the disclosure of which is incorporated herein by reference.

The compatibilizer is characterized by having variable but controlled degrees of grafted ITA or MODIT, that is, the actual degeree of grafting that can be obtained reproducibly. These compatibilizers can be used optimally to prepare nanocomposites depending on the degree of grafting of the compatibilizer and the cation exchange capacity of the clay. The most widely used compatibilizers are polyolefins modified with maleic anhydride, which have a lower degree of grafting and therefore lower polarity than the compatibilizers used in this invention.

It must also be pointed out that the compatibilizers considered in this invention use itaconic acid, which has the great advantage of being obtained from natural and renewable resources such as, for example, by fermentation of molasses, a by-product of sugar industry, while maleic anhydride is a synthetic and not a natural product.

Finally, the use of ITA and MODIT as alternative organic compounds like for preparing hybrid clays and compatibilizers, together with the polyolefins, make it possible to produce nanocomposites with improved thermal and mechanical properties.

The description of this invention also considers:

2. Procedure for obtaining these hybrid clays of this invention and their use in processes for obtaining polymeric polyolefin/clay nanocomposites.

To obtain the hybrid clays or clays modified with ITA or MODIT, an ion exchange reaction is used by means of a procedure of intercalation in solution is used. The intercalation process developed in this invention is a simple process for modifying clays that uses technical grade solvents and ITA or MODIT as organic compounds. The hybrid clay is obtained by mixing the unmodified clay suspension with the ITA or MODIT solution with stirring, then filtering, and drying to constant weight. The hybrid clay produced has a hydrophobic character and is free from impurities.

The hybrid clays obtained in this invention are used in processes for obtaining nanocomposites of polyolefins and clays by first preparing the so-called "masterbatch", that is, a mixture of hybrid clay and compatibilizer with a given composition that corresponds to a ratio of ⅓ hybrid clay/compatibilizer. The compatibilizer is a polyolefin grafted with ITA (PP-g-ITA) or MODIT (PP-g-MODIT), and it is characterized by a given degree of grafting of ITA or MODIT. The hybrid clay of this invention is characterized by the increase of its hydrophobic character, which allows a good dispersion in polyolefins for preparing nanocomposites based on polyolefins and clays. Finally, the process for preparing the nanocomposite comprises the melt mixing of a given amount of the masterbatch and the polyolefin by using a discontinuous mixer. The use of a discontinuous mixer to carry out the melt mixing corresponds to a simple procedure, in contrast with the process that uses extruders specially designed for preparing these kinds of nanocomposites.

Therefore the invention comprises the following procedures:

Hybrid clays or clays intercalated with ITA or MODIT (Procedure 1).

Nanocomposites based on polyolefins and the hybrid clays of the present this invention (Procedure 2).

Procedure 1

Obtaining hybrid clays or clays intercalated with ITA or MODIT as alternative compounds of this invention like. It comprises the following stages:

Obtaining a suspension of clays such as monmorillonite (Mo) or natural hectorite (Hn) clay or bentonite or saponite (8-10 g/l) in a 1/1 v/v ethyl alcohol/water mixture by mechanical stirring for 20-40 minutes at 20-30° C. (suspension 1).

Dissolving 3.0 to 3.2 grams of the organic compound ITA or MODIT of this invention in 1 liter of ethyl alcohol at 40-70° C. and adjusting the pH to 2.8-3.2 with an inorganic acid such as hydrochloric acid (solution 1).

Adding solution 1 to suspension 1 and mixing with mechanical stirring during 1.5-3 hours at 25-70° C. (suspension 2). Separating the solid content of suspension 2 by filtration at atmospheric pressure and 25-40° C.

Drying the solid obtained in stage (d) during 10-15 hours at 40-80° C.

Washing the solid obtained in stage (e) with a 1/1 ethyl alcohol/water mixture, and then drying at 60° C. for 12 hours.

Grinding the dry solid obtained in stage (f) in a laboratory mill to standard 325 mesh.

In stage (g) the Mo or Hn or bentonite or saponite hybrid clay is obtained, which corresponds to the Mo or Hn or bentonite or saponite clay with its layers more separated due to the partial replacement of the interlaminar cations of the Mo or Hn or bentonite or saponite clay by intercalation of ITA or MODIT. This greater separation of the layers of the hybrid clay has been determined and confirmed by X-ray diffraction analysis. Therefore, the clay is hybrid due to the presence of the organic layer corresponding to the clay modified by the organic compounds ITA or MODIT.

Procedure 2

Obtaining nanocomposites based on polyolefins and the hybrid clays of this invention.

It comprises the following stages:

Obtaining the hybrid clay by organic modification of a smectic type clays such as montmorillonite, bentonite, hectorite, saponite, etc. by intercalation with ITA or MODIT in an acid medium at pH 2.8-3.2.

Preparation of the Masterbatch, which Comprises Mixing the Hybrid Clay with compatibilizers PP-g-ITA or PP-g-MODIT. This mixture, which contains a 1/3 w/w hybrid clay/compatibilizer ratio takes place in a discontinuous mixer at 75-90 rpm, 190-195° C. during 10-15 minutes in a stream of an inert gas such as nitrogen.

Obtaining the nanocomposite by diluting the masterbatch in the polyolefin in the melt phase by using the discontinuous mixer of stage (b). The resulting nanocomposite contains 1%-5% by weight of hybrid clay.

Stage (a) is carried out according to the method described above in procedure 1, and it is applicable to the smectic clays used in this invention.

Stage (b), preparation of the masterbatch, is carried out in a discontinuous mixer in the molten phase at temperatures of 190-195° C., during 10-15 min and at a mixing speed of 75-90 rpm. The components of the masterbatch are: the hybrid clay of this invention, that is, clay modified with ITA or MODIT; noncommercial compatibilizer PP-g-ITA or PP-g-MODIT; and antioxidants, for example, betahydroxytoluene or Irganox 1010® and Irgafos 168® in a 1/1 ratio. The proportion by weight of hybrid clay and compatibilizer in the masterbatch is ⅓ w/w. The proportion of antioxidant in the masterbatch can be 0.02-0.03% by weight of the total mass of the masterbatch.

Stage (c), obtaining the polymer polyolefin/clay nanocomposites, comprises the suspension dispersion of the masterbatch by dilution with in a polyolefin in the molten phase in the discontinuous mixer under controlled temperature, time and mixing speed (190-195° C., 10-15 min, 75-90 rpm) in a stream of an inert gas such as nitrogen whose function is to replace the oxidizing environment (air) to avoid oxidation of the polyolefin. Nanocomposites with a high degree of exfoliation of the clay, that is, a system consisting of clay nanosheets with good dispersion in the polymer matrix is obtained by this process. The amount of the hybrid clay in the polyolefin matrix is in the range of 1-5% by total weight of the nanocomposite. Furthermore, antioxidants were also used at 0.02-0.03% by weight of the polyolefin in the formulation of the nanocomposites.

EXAMPLES

The examples include the methodology for obtaining:

Hybrid clays or clays intercalated with the ITA or MODIT monomers of this invention (Example 1).

Nanocomposites based on polyolefins and hybrid clays of this invention (Example 2).

Example 1

Methodology for obtaining hybrid clays or clays intercalated with the monomers ITA or MODIT, of used in this invention.

The clays used are of the smectic type, such as montmorillonite (Mo) and natural hectorite (Hn), supplied by the Netherland Organisation for Applied Scientific Research-NTO of Holland (Table 1).

TABLE 1

Cation exchange capacity (CEC), interlaminar distance ($d_{001}$) plane, elemental composition and empirical formula of the clays used in this invention.

| Code | Montmorillonite Mo | Natural Hectorite Hn |
|---|---|---|
| CEC (meq/100 g) | 83 | 100 |
| $d_{001}$ (nm) | 1.21 | 1.13 |
| $SiO_2$ (%) | 54.4 | 51.0 |
| $Al_2O_3$ (%) | 18.2 | 1.7 |
| $Na_2O$ (%) | 3.5 | 2.9 |
| $Li_2O$ (%) | <0.1 | 0.9 |
| $Fe_2O_3$ (%) | 3.5 | 0.6 |
| MgO (%) | 2.0 | 21.3 |
| CaO (%) | 0.6 | 1.8 |
| $K_2O$ (%) | 0.2 | 0.4 |
| Empirical formula | $Mo_{0.62}(Al_{1.58}, Mg_{0.22})Si_4O_{10}(OH)_2 \cdot nH_2O$ | $Mo_{0.78}(Al_{0.16}Mg_{2.49}, Li_{0.28})Si_4O_{10}(OH)_2 \cdot nH_2O$ |

In this example the stages for obtaining hybrid montmorillonite (Mo) by intercalation of ITA in an acid medium are described; they comprise the cation exchange reaction with the ITA monomer. For that purpose a suspension of Mo in 1/1 v/v ethyl alcohol/water was prepared using by dispersing 5 grams of Mo in 500 ml of 1/1 v/v ethyl alcohol/distilled water with stirring for 30 minutes. Separately, 1.6 grams of ITA was dissolved in 500 ml of ethyl alcohol at 50° C. and the pH was adjusted to 3.0 with hydrochloric acid. Then the solution of ITA or MODIT was added to the Mo suspension, again adjusting the pH to 3.0 and continuing the stirring for 2 hours at 50° C. The modified (hybrid) clay was then filtered, washed with a 1/1 v/v/ethyl alcohol water mixture and dried at 60° C. for 12 hours. The resulting hybrid Mo was grounded in a laboratory mill to 325 mesh.

The same procedure already described in example 1 is valid for obtaining a hybrid Mo by intercalating the organic compound MODIT. This procedure is also applied to obtain the hybrid Hn or saponite or bentonite clay by intercalating the organic compounds ITA or MODIT in these clays. The hybrid clays are characterized by X-ray diffraction analysis to verify the increase of their interlaminar spacings as the result of intercalation with ITA or MODIT monomer of this invention and were compared with the spacings obtained by intercalation of clays with octadecylamine (ODA) (see Table 2 and FIG. 1).

Table 2 shows the interlaminar distance of the d001 plane of unmodified Mo and Hn clays and modified by means of the intercalation of ITA or MODIT.

TABLE 2

Interlaminar spacing ($d_{001}$) of modified and unmodified clays.

| Clay | Mo $d_{001}$ (nm) | Hn $d_{001}$ (nm) |
|---|---|---|
| Unmodified | 1.2 | 1.1 |
| Modified with ITA | 1.5 | 1.5 |
| Modified with MODIT | 1.7 | 1.8 |

FIG. 1 shows the X-ray diffraction patterns of unmodified Mo (1) and modified Mo by intercalation of ITA (2) or MODIT (3).

FIG. 1 also shows the decrease of the diffraction angle 2θ at the maximum relative diffraction intensity when the Mo clay is modified by intercalation of ITA or MODIT with respect to the unmodified (nonintercalated) Mo. The smaller 2θ value corresponding to the maximum relative diffraction intensity reflects the larger interlaminar distance or spacing in the hybrid clay due to the intercalated ITA or MODIT monomer.

Example 2

Methodology for obtaining nanocomposites based on polyolefins and hybrid clays of this invention.

The polyolefin/hybrid clay nanocomposite of this invention comprises the following raw materials: i) polyolefin; ii) hybrid clay corresponding to clay intercalated with either ITA or MODIT monomers; iii) compatibilizer such as PP-g-ITA or PP-g-MODIT; and iv) antioxidants.

i) The commercial polyolefins used were Ziegler-Natta polypropylene (PP) homopolymers from Petroquim S. A. designated as PP ZN340, PP ZN250 and PP ZN150 respectively with melt flow indexes (MFI) of 3, 13 and 26. The properties of PP samples used are shown in Table 3.

TABLE 3

Melt flow index (MFI), average molecular weights ($\overline{Mw}$ and $\overline{Mn}$), polydispersity index (Pd), tensile modulus (E), tensile strength (σy), deformation at break (ε) of the Ziegler Natta (ZN) PP samples.

| PP | MFI | $\overline{Mw}$ (Kg./mol) | Pd ($\overline{Mw}/\overline{Mn}$) | E (MPa) | $\sigma_y$ (MPa) | ε (%) |
|---|---|---|---|---|---|---|
| ZN 340 | 3 | 340 | 3.9 | 1090 ± 30 | 30 ± 1 | 250 |
| ZN 250 | 13 | 250 | 3.4 | 1080 ± 40 | 30 ± 2 | 100 |
| ZN 150 | 26 | 150 | 4.4 | 1092 ± 45 | 32 ± 2 | 20 |

(ii) Clays: smectic type such as montmorillonite (Mo) and natural hectorite (Hn), supplied by Netherland Organisation for Applied Scientific Research-NTO of Holland (see Table 1).

(iii) Compatibilizer: PP ZN250 with MFI=13 grafted with ITA with controlled degree of grafting between 0.7% and 1.8% by weight of ITA, or grafted with MODIT with controlled degree of grafting between 0.5 and 1.5% by weight of MODIT, developed by the authors of the aforementioned WO 2008/044121. (see Table 4).

TABLE 4

Properties of compatibilizers used in this invention, prepared by grafting of PP ZN250 with itaconic acid (PP-g-ITA) or with monooctadecyl itaconate (PP-g-MODIT) with different degrees of grafting.

| Code | Weight percentage of grafted ITA | Code | Weight percentage of grafted MODIT |
|---|---|---|---|
| PP-g-ITA$_{0.7}$ | 0.7 | PP-g-MODIT$_{0.5}$ | 0.5 |
| PP-g-ITA$_{1.0}$ | 1.0 | PP-g-MODIT$_{1.0}$ | 1.0 |
| PP-g-ITA$_{1.8}$ | 1.8 | PP-g-MODIT$_{1.4}$ | 1.4 |

(iv) Antioxidant; Beta-hydroxytoluene (BHT), Irganox 1010® and/or Irgafos 168® in a 2/1 ratio.

This example describes the stages for obtaining the preparation of polypropylene (PP ZN340) nanocomposite of containing 1.0% by weight of hybrid montmorillonite (Mo) by using a masterbatch prepared from mixing of hybrid Mo and noncommercial compatibilizer PP-g-AIT$_{1.0}$ having 1% by weight of grafted ITA with an hybrid Mo/PP-g-ITA ratio of 1/3 and for a total mass of 35 grams.

a) Obtaining the hybrid Mo by the methodology described in example 1.

Preparation of the masterbatch, which comprises mixing 9.25 grams of the hybrid Mo obtained in stage (a), 27.7 grams of compatibilizer PP-g-AIT$_{1.0}$ having 1% by weight of grafted ITA and 0.02 grams of BHT and 0.02 grams of Irganox 1010® as antioxidants. This mixture is carried out in a discontinuous mixer at 80 rpm, 190° C. and 10 min in a stream of inert gas, for example nitrogen.

c) Preparation of Obtaining the nanocomposite: it comprises the mixing of 1.48 grams of masterbatch which is a mixture of Mo and compatibilizer PP-g-AIT$_{1.0}$ with an Mo/PP-g-AIT$_{1.0}$ ratio of 1/3 prepared in stage (b), 35.6 grams of polypropylene PP ZN340, and 0.02 grams of BHT and 0.02 grams of Irganox 1010® as antioxidants. This mixture is made in a discontinuous mixer at 190° C., 80 rpm and 10 min in a stream of nitrogen as inert gas like, whose function is to displace the oxidizing air environment from the mixing chamber and to prevent the oxidation of the polypropylene. The nanocomposite prepared in this way contains 1% by weight of hybrid Mo in the polymer matrix.

The same procedure described in example 2 is valid for nanocomposites obtained using hybrid clays other than Mo intercalated with ITA monomer, like Mo intercalated with MODIT monomer as well as Hn intercalated with ITA and Hn intercalated with MODIT, and with different PP samples such as PP ZN250 and or PP ZN150, together with PP-g-MODIT as compatibilizer which contains either 0.5%, 1.0% or 1.2% by weight of grafted MODIT.

Mechanical, thermal and crystallographics properties of the nanocomposites

The tests carried out to verify the mechanical and thermal properties of PP nanocomposites as well as the existence of exfoliated or intercalated state of the clays were the following:

Tensile tests according to the ASTM Standard Method D 638, to determine the Young's tensile modulus (E) in megapascals (MPa), and the tensile strength (σy) in megapascals (MPa) and elongation at breakage (%) (Table 5-10).

Thermal tests by thermogravimetric analysis that make it possible to obtain the thermal decomposition temperature measured as the temperature corresponding to a 50% weight loss, coded as "$T_{50}$" and referred to as thermal stability (Table 11).

X-ray diffraction analysis to verify qualitatively the exfoliation or intercalation state of the clays (FIG. 1).

TABLE 5

Elastic modulus Tensile modulus (E), elastic limit tensile strength ($\sigma_y$), and elongation at breakage ($\epsilon$) of nanocomposites containing 1% of hybrid clays obtenues by modification of Mo or Hn with ITA or MODIT, 3% by weight of PP-g-ITA$_{0.7}$ as compatibilizer and PPs with different melt indexes as matrix

| PP | E (MPa) | $\sigma_y$ (MPa) | $\epsilon$ (%) | E (MPa) | $\sigma_y$ (MPa) | $\epsilon$ (%) |
|---|---|---|---|---|---|---|
| | Hn-ITA | | | Mo-ITA | | |
| ZN 340 | 1334 ± 34 | 37 ± 1 | 25 ± 2 | 1326 ± 22 | 36 ± 1 | 52 ± 3 |
| ZN 150 | 1407 ± 35 | 37 ± 1 | 10 ± 1 | 1529 ± 32 | 36 ± 2 | 6 ± 2 |
| | Hn-MODIT | | | Mo-MODIT | | |
| ZN 340 | 1495 ± 34 | 39 ± 1 | 115 ± 8 | 1511 ± 21 | 38 ± 1 | 220 ± 12 |
| ZN 150 | 1604 ± 33 | 37 ± 1 | 12 ± 1 | 1589 ± 37 | 40 ± 1 | 11 ± 1 |

TABLE 6

Elastic Tensile modulus (E), elastic limit tensile strength ($\sigma_y$), and elongation at breakage ($\epsilon$) of nanocomposites containing 1% by weight of natural hectorite modified with ODA (Hn-ODA), 3% by weight of either PP-g-ITA$_{0.7}$ or PP-g-AMA$_{0.6}$ as compatibilizer and polypropylene PP ZN340 as matrix

| | Hn-ODA | | |
|---|---|---|---|
| Compatibilizer | E (MPa) | $\sigma$ (MPa) | E (%) |
| PP-g-ITA$_{0.7}$ | 1585 | 39 | 15 |
| PP-g-AMA$_{0.6}$ | 1425 | 35 | 14 |

TABLE 7

Tensile modulus (E), tensile strength ($\sigma_y$), and elongation at break ($\epsilon$) of nanocomposites containing 1% by weight of montmorillonite modified with ODA (Mo-ODA), 3% by weight of either PP-g-ITA or PP-g-MA and polypropylene ZN 340 as matrix

| | Mo-ODA | | |
|---|---|---|---|
| Compatibilizer | E (MPa) | $\sigma$ (MPa) | $\epsilon$ (%) |
| PP-g-ITA$_{0.7}$ | 1497 | 34 | 15 |
| PP-g-MA$_{0.6}$ | 1387 | 36 | 15 |

TABLE 8

Tensile modulus (E), tensile strength ($\sigma_y$), and elongation at break ($\epsilon$) of nanocomposites containing 1% by weight of hybrid clay, Mo or Hn, modified with ITA or MODIT, 3% by weight of PP-g-ITA$_{1.0}$ as compatibilizer and polypropylens with different melt flow indexes as matrix.

| PP | E (MPa) | $\sigma_y$ (MPa) | $\epsilon$ (%) | E (MPa) | $\sigma_y$ (MPa) | $\epsilon$ (%) |
|---|---|---|---|---|---|---|
| | Hn-ITA | | | Mo-ITA | | |
| ZN 340 | 1532 ± 39 | 40 ± 1 | 150 ± 20 | 1458 ± 36 | 37 ± 1 | 85 ± 4 |
| ZN 150 | 1690 ± 45 | 40 ± 1 | 10 ± 1 | 1621 ± 27 | 37 ± 1 | 10 ± 1 |
| | Hn-MODIT | | | Mo-MODIT | | |
| ZN 340 | 1556 ± 25 | 37 ± 1 | 70 ± 4 | 1606 ± 33 | 38 ± 1 | 93 ± 5 |
| 150 | 1592 ± 21 | 39 ± 1 | 10 ± 2 | 1610 ± 36 | 39 ± 1 | 10 ± 1 |

TABLE 9

Tensile modulus (E), tensile strength ($\sigma_y$), and elongation at break ($\epsilon$) of nanocomposites containing 1% by weight of hybrid clay, Mo or Hn, modified with ITA or MODIT, 3% by weight of PP-g-ITA$_{1.8}$ as compatibilizer and polypropylenes with different melt flow indexes as matrix.

| PP | E (MPa) | $\sigma_y$ (MPa) | $\epsilon$ (%) | E (MPa) | $\sigma_y$ (MPa) | $\epsilon$ (%) |
|---|---|---|---|---|---|---|
| | Hn-ITA | | | Mo-ITA | | |
| ZN 340 | 1448 ± 23 | 37 ± 1 | 80 ± 5 | 1484 ± 32 | 38 ± 1 | 60 ± 10 |
| ZN 150 | 1655 ± 45 | 38 ± 2 | 12 ± 1 | 1655 ± 23 | 41 ± 1 | 9 ± 1 |
| | Hn-MODIT | | | Mo-MODIT | | |
| ZN 340 | 1383 ± 23 | 36 ± 1 | 50 ± 5 | 1478 ± 32 | 41 ± 1 | 112 ± 9 |
| ZN 150 | 1589 ± 26 | 37 ± 1 | 7 ± 1 | 1748 ± 23 | 40 ± 1 | 9 ± 2 |

TABLE 10

Tensile modulus (E), tensile strength ($\sigma_y$), and elongation at break ($\epsilon$) of nanocomposites containing 1% by weight of hybrid clay, Mo or Hn, modified with ITA or MODIT, 3% by weight of PP-g-MA$_{0.6}$ as compatibilizer and polypropylenes with different melt flow indexes as matrix.

| PP | E (MPa) | $\sigma_y$ (MPa) | $\epsilon$ (%) | E (MPa) | $\sigma_y$ (MPa) | $\epsilon$ (%) |
|---|---|---|---|---|---|---|
| | Hn-ITA | | | Mo-ITA | | |
| ZN 340 | 1289 ± 42 | 37 ± 1 | 23 ± 1 | 1365 ± 32 | 36 ± 1 | 12 ± 2 |
| ZN 150 | 1552 ± 39 | 36 ± 1 | 7 ± 2 | 1554 ± 19 | 41 ± 1 | 9 ± 1 |
| | Hn-MODIT | | | Mo-MODIT | | |
| ZN 340 | 1390 ± 22 | 35 ± 1 | 105 ± 5 | 1389 ± 23 | 36 ± 1 | 85 ± 4 |
| ZN 150 | 1475 ± 25 | 38 ± 1 | 8 ± 2 | 1441 ± 34 | 36 ± 1 | 8 ± 2 |

The mechanical properties of the nanocomposites of polyolefins and hybrid clays of this invention show:

Greater rigidity (E) (5 to 10% increase) and higher tensile strength ($\sigma_y$) (5 to 15% increase) for the nanocomposites of polyolefins and hybrid clays intercalated with ITA or MODIT and which use PP-g-ITA compatibilizer than the similar nanocomposites that use PP-g-MA as compatibilizer. This is valid for the nanocomposites with 1% by weight of hybrid clays and the PPs used in this invention.

The rigidity or tensile modulus (E) and tensile strength ($\sigma_y$) of the nanocomposites of polyolefins and clays are determined by the melt flow index of the PP and the percentage of grafting of the ITA or MODIT in the PP-g-ITA or PP-g-MODIT compatibilizer.

According to these results it can be established that the hybrid clays of this invention are alternative and competitive raw materials for obtaining nanocomposites with improved mechanical properties for applications in the automotive, aviation, construction and packaging industry.

TABLE 11

Thermal stability of nanocomposites obtained by using different compatibilizers, 1% by weight of montmorillonite modified with MODIT (M-MODI) and PP ZN 150 as matrix.

| Matrix | Compatibilizer | $T_{50}$ (° C.) |
|---|---|---|
| PP ZN 150 | PP-g-AI$_{0.7}$ | 450 |
| | PP-g-AI$_{1.0}$ | 452 |
| | PP-g-AI$_{1.8}$ | 491 |
| | PP-g-AM$_{0.6}$ | 392 |
| | PP-g-MODI$_{0.5}$ | 389 |
| | PP-g-MODI$_{1.4}$ | 395 |
| | Without compatibilizer | 386 |

According to the thermal tests of the nanocomposites obtained using hybrid clays montmorillonite modified with MODIT (Mo-MODIT), PP ZN150 as matrix and compatibilizers PP-g-ITAx, PP-g-MODITx or PP-AM with different percentage of grafted ITA, MODIT or AM on PP, it can be established that:

Higher thermal stability ($T_{50}$) than the similar nanocomposites without compatibilizer.

Increased thermal stability ($T_{50}$) for nanocomposites with compatibilizar in following order:

PP-g-AMAx$\geq$PP-g-MODITx$\geq$PP-g-ITAx

Increasing of thermal stability ($T_{50}$) with higher percentage of grafted ITA or MODIT on the PP matrix According to these results it can be established that the hybrid clays of this invention and using PP-g-AIT o PP-g-MODIT compatibilizantes are alternative and competitive raw materials for obtaining nanocomposites with improved thermal properties for applications in the automotive, aviation, construction and packaging industry.

X-Ray Diffraction Analysis

According to the X-ray diffraction analysis of the hybrid clays clays intercalated with ITA or MODIT of this invention, it can be stated that:

The smectic clays used in this invention can be modified (intercalated) with ITA or MODIT as alternative organic compounds.

The interlaminar distance of the hybrid clays lies within the nanometer range, and that interlaminar distance is greater (42 to 64% increase) than that of the clay without intercalation.

The hybrid clays of this invention are alternative nanoparticles based on smectic clays, such as clays modified (intercalated) with octadecylamine which is a commertially available amine.

We claim:

1. A hybrid clay for obtaining nanocomposites comprising smectite clay intercalated with the itaconic acid (ITA) monomer or a derivative thereof, including monooctadecyl itaconate (MODIT).

2. The hybrid clay according to claim 1, wherein the smectite clay is a laminar phyllosilicate, including montmorillonite, hectorite, bentonite and saponite, and a mixture thereof.

3. The hybrid clay according to claim 2, wherein the smectite clay is selected from the group consisting of montmorillonite, hectorite, bentonite and saponite, and a mixture thereof 4. A hybrid clay according to claim 1 wherein the interlayer spacing is between about 1.7-1.9 nanometers.

5. A nanocomposite comprising a first polyolefin polymer, a hybrid clay according to claim 1, and a compatibilizer comprising a second polyolefin grafted with ITA or MODIT.

6. The nanocomposite according to claim 5 wherein the first polyolefin polymer has a melt flow index selected from the group consisting of 3, 13 and 26.

7. The nanocomposite according to claim 5, wherein the compatibilizer comprises the second polyolefin having a degree of grafting with ITA of between 0.7% and 1.8%, or a degree of grafting with MODIT of between 0.5% to 1.5%.

8. The nanocomposite according to claim 7, wherein the first polyolefin polymer has a melt flow index selected from the group consisting of 3, 13 and 26.

9. The nanocomposite according to claim 5, wherein the smectite clay is a laminar phyllosilicate, including montmorillonite, hectorite, bentonite and saponite, and a mixture thereof.

10. The nanocomposite according to claim 9, wherein the interlayer spacing of the smectite clay is between about 1.7-1.9 nanometers.

11. The nanocomposite according claim 5, further including an antioxidant.

12. The nanocomposite according to claim 11, wherein the antioxidant is selected from the group consisting of beta-hydroxytoluene (BHT), pentaerythritol tetrakis(3,5-di-tert-butyl-4-hydroxyphenyl-propenoate), and tris(2,4-di-tert-butylphenyl)phosphite, and mixtures thereof.

13. The nanocomposite according to claim 5, wherein the nanocomposite contains 1%-5% by weight of the hybrid clay.

14. The nanocomposite according to claim 13, wherein the ratio of the hybrid clay to the compatibilizer is 1:3.

* * * * *